(12) United States Patent
Shinoda et al.

(10) Patent No.: US 9,987,912 B2
(45) Date of Patent: Jun. 5, 2018

(54) VEHICLE BODY REAR STRUCTURE

(71) Applicant: HONDA MOTOR CO., LTD., Tokyo (JP)

(72) Inventors: Ryo Shinoda, Wako (JP); Tomoyuki Okada, Wako (JP); Ryo Fujii, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days. days.

(21) Appl. No.: 15/375,275

(22) Filed: Dec. 12, 2016

(65) Prior Publication Data

US 2017/0174064 A1    Jun. 22, 2017

(30) Foreign Application Priority Data

Dec. 22, 2015    (JP) ................................. 2015-249359

(51) Int. Cl.
     *B60K 1/04*          (2006.01)
     *B62D 21/02*        (2006.01)
     (Continued)

(52) U.S. Cl.
     CPC ................ *B60K 1/04* (2013.01); *B62D 21/02* (2013.01); *B62D 21/155* (2013.01);
     (Continued)

(58) Field of Classification Search
     CPC .............. B60K 1/04; B60K 2001/0416; B60K 2001/0438; B60L 11/1877
     See application file for complete search history.

(56) References Cited

U.S. PATENT DOCUMENTS

| | | | |
|---|---|---|---|
| 5,390,754 A * | 2/1995 | Masuyama | B60K 1/04 105/51 |
| 8,905,171 B2 * | 12/2014 | Lee | H01M 2/1077 180/68.5 |
| 2003/0098191 A1 * | 5/2003 | Takedomi | B60K 1/04 180/68.5 |

(Continued)

FOREIGN PATENT DOCUMENTS

| | | |
|---|---|---|
| JP | 60-122279 U | 8/1985 |
| JP | 2001-328439 A | 11/2001 |

(Continued)

OTHER PUBLICATIONS

Office Action dated Jul. 18, 2017, issued in counterpart Japanese Application No. 2015-249359, with machine translation. (6 pages).

*Primary Examiner* — Frank B Vanaman
(74) *Attorney, Agent, or Firm* — Westerman, Hattori, Daniels & Adrian, LLP

(57) ABSTRACT

A vehicle body rear structure is provided with a battery pack disposed in a floor recess of a rear floor panel. The battery pack includes battery modules, a pair of front suspended frame and rear suspended frame that hold the battery modules at the front and rear ends in such a manner that the battery modules are suspended from a vehicle body, and load path members through which the front suspended frame and the rear suspended frame are coupled to each other. The front suspended frame and the rear suspended frame have flanged collars and through-holes that are fastened to rear frames and fragile portions that are provided in the vicinity of the flanged collars and the through-holes and at which the front suspended frame and the rear suspended frame are bent forward when the vehicle body is subjected to an impact load in a rear-end collision.

11 Claims, 9 Drawing Sheets

(51) Int. Cl.
*B62D 21/15* (2006.01)
*B62D 25/20* (2006.01)
*B62D 29/00* (2006.01)
*B62D 29/04* (2006.01)

(52) U.S. Cl.
CPC ....... *B62D 25/2027* (2013.01); *B62D 29/008* (2013.01); *B62D 29/043* (2013.01); *B60K 2001/0416* (2013.01); *B60K 2001/0438* (2013.01); *B60Y 2200/91* (2013.01); *B60Y 2200/92* (2013.01); *B60Y 2306/01* (2013.01); *B60Y 2410/122* (2013.01); *B60Y 2410/124* (2013.01)

(56) References Cited

U.S. PATENT DOCUMENTS

| | | | | |
|---|---|---|---|---|
| 2004/0090085 A1* | 5/2004 | Kawasaki | ................ | B60K 1/04 296/187.09 |
| 2007/0040418 A1* | 2/2007 | Ohkuma | .................. | B60K 1/04 297/15 |
| 2007/0215399 A1* | 9/2007 | Watanabe | ................ | B60K 1/04 180/68.5 |
| 2010/0276220 A1* | 11/2010 | Kubota | .................... | B60K 1/04 180/68.1 |
| 2013/0045407 A1* | 2/2013 | Le Jaouen | ............... | B60K 1/04 429/100 |

FOREIGN PATENT DOCUMENTS

| | | |
|---|---|---|
| JP | 2007-22350 A | 2/2007 |
| JP | 2014-221622 A | 11/2014 |

* cited by examiner

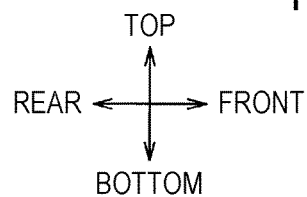
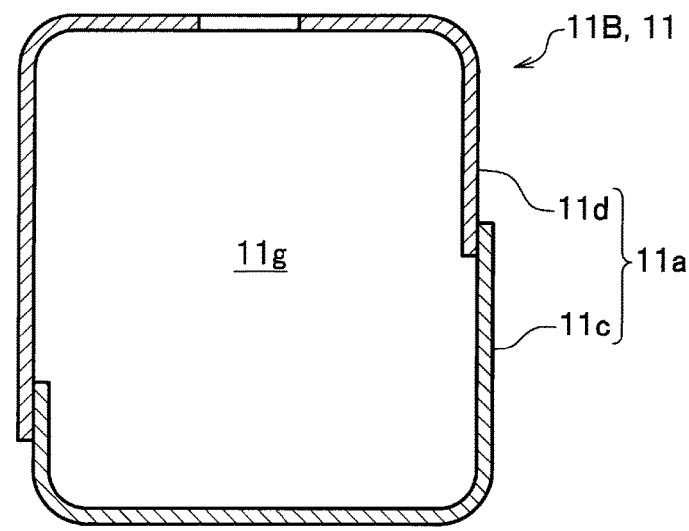
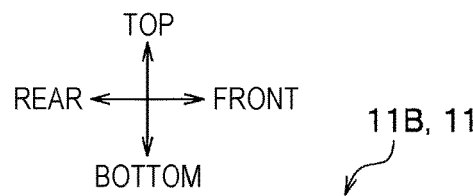
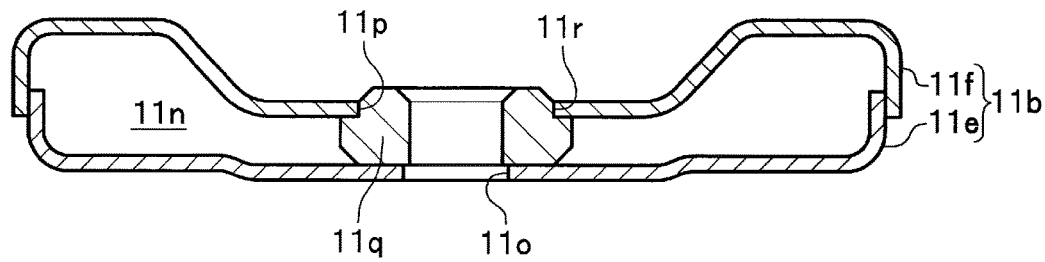

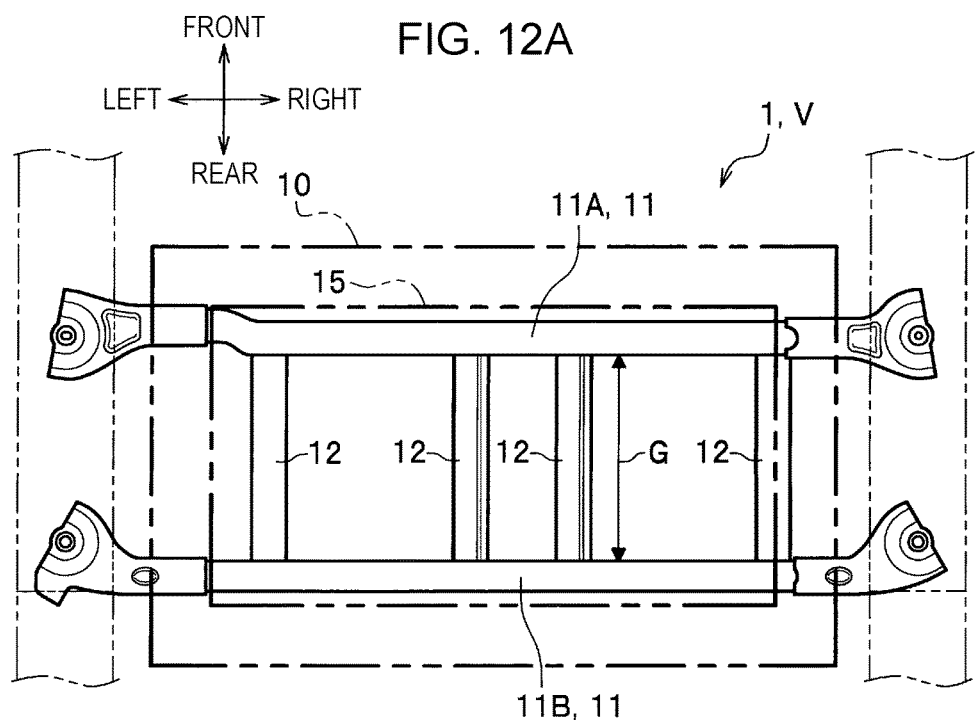
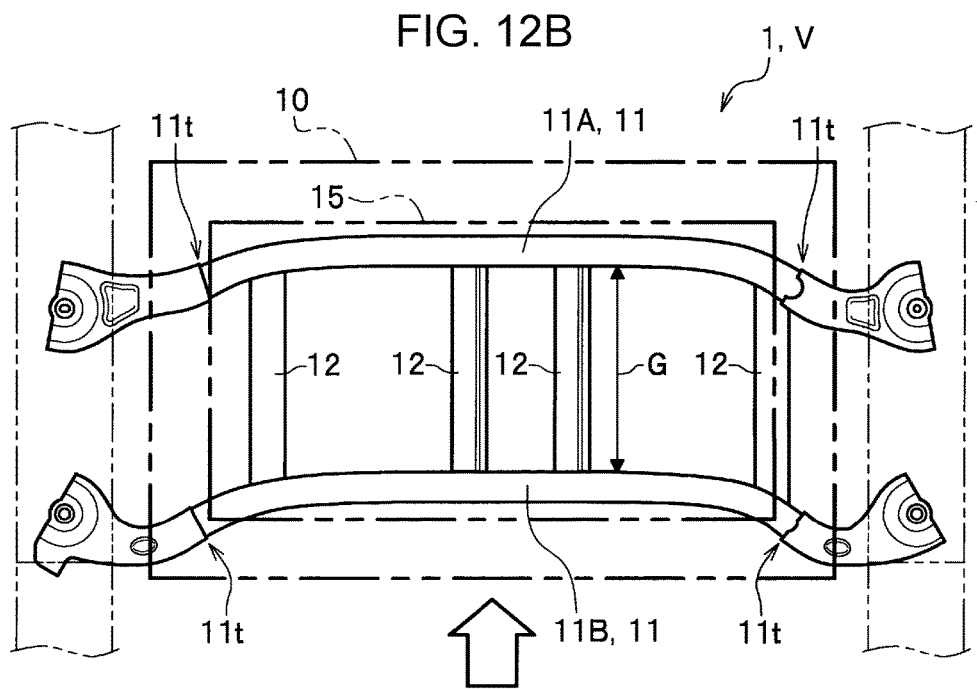

VEHICLE BODY REAR STRUCTURE

CROSS REFERENCES TO RELATED APPLICATIONS

The present application claims priority under 35 U.S.C. § 119 to Japanese Patent Application No. 2015-249359, filed Dec. 22, 2015, entitled "Vehicle Body Rear Structure." The contents of this application are incorporated herein by reference in their entirety.

BACKGROUND

1. Field

The present disclosure relates to a vehicle body rear structure.

2. Description of the Related Art

There have been developed various types of techniques for protecting batteries mounted in the rear section of a vehicle in the event of a rear-end collision.

Known examples of such techniques include a technique by which a frame for mounting and supporting batteries on a vehicle body is reinforced through the use of a high-rigidity material, thereby reducing an impact to the batteries in the event of a rear-end collision (see, for example, Japanese Unexamined Patent Application Publication No. 2001-328439).

In addition, the reinforcement of the frame has been typically implemented through the use of additional reinforcing members or increased plate thickness.

However, the reinforcement of the frame through the use of a high-rigidity material, additional reinforcing members, or increased plate thickness as described in the prior art may raise an issue about an increase in weight and cost.

SUMMARY

The present application describes a vehicle body rear structure that can reduce an impact to a battery pack of the vehicle while contributing to reducing cost and weight.

A first aspect of the present application provides a vehicle body rear structure which includes a floor recess (an underfloor space for a battery) depressed downward from a rear floor and a battery pack disposed in the floor recess in which the battery pack includes battery modules, a pair of front and rear suspended frames that hold the battery modules at the front and rear ends in such a manner that the battery modules are suspended from a vehicle body, and load path members through which the pair of suspended frames are connected to each other and in which the suspended frames have vehicle body fastening points that are fastened to the vehicle body and fragile portions that are provided in the vicinity of the vehicle body fastening points and at which the suspended frames are bent forward when the vehicle body is subjected to an impact load in the event of a rear-end collision.

With this arrangement, the suspended frames are bent forward at the fragile portions in the event of a rear-end collision. In conjunction with this, the battery pack is moved forward relative to the vehicle body, thereby reducing an impact to the battery pack. In addition, the forward movement of the battery pack for reducing the impact eliminates the need for reinforcing the battery pack itself, contributing to weight reduction and cost saving.

A second aspect of the present application provides the vehicle body rear structure in which each of the pair of suspended frames preferably has a frame main body having a closed section extending in the vehicle-width direction and vehicle body fastening members that are secured to both ends in the vehicle-width direction of the frame main body and that include the vehicle body fastening points and in which the fragile portions are preferably formed in predetermined areas including joining areas between the frame main body and the vehicle body fastening members.

With this arrangement, the strength of the fragile portions can be adjusted simply by adjusting the joint strength of the joining areas, making it easier to design the fragile portions.

A third aspect of the present application provides the vehicle body rear structure in which cutouts formed by cutting ends in the vehicle-width direction of the frame main body are preferably provided in regions adjacent to or close to the joining areas.

With this arrangement, the strength of the fragile portions can be adjusted simply by increasing or reducing the amount of cutout, making it easier to design the fragile portion 11t.

A fourth aspect of the present application provides the vehicle body rear structure in which the joining areas preferably consist of one-side welding where the frame main body and the vehicle body fastening members are partially joined to each other.

With this arrangement, the strength of the joining areas can be adjusted simply by adjusting welding strength, making it easier to configure the strength of the joining areas.

A fifth aspect of the present application provides the vehicle body rear structure in which, preferably, the vehicle body fastening members extend upward toward the frame main body from the vehicle body and are bent toward the inboard side in the vehicle-width direction of the vehicle body and in which the bent portions are preferably disposed within regions of the fragile portions.

This arrangement enables the forward movement of the battery pack to be increased through the use of an upper space as well. In addition, the battery pack can be vertically sized up.

A sixth aspect of the present application provides the vehicle body rear structure in which, preferably, further includes a pair of right and left rear frames that are disposed on the right and left sides of the floor recess, respectively, and that extend in the longitudinal direction, in which the rear frames preferably have higher-strength sections located closer to a vehicle front and lower-strength sections that are located closer to a vehicle rear at the rear of the higher-strength sections and that have lower compressive strength against an impact load from the vehicle rear than the higher-strength sections and in which, preferably, the vehicle body fastening members of the rear suspended frame are bent toward the vehicle front and are fastened to the higher-strength sections.

With this arrangement, the clearance between the front and rear vehicle body fastening members bolted to the higher-strength sections can be maintained at a constant level in the longitudinal direction even if the lower-strength sections in the rear sections of the rear frames collapse, thereby reducing an impact to the battery pack.

A seventh aspect of the present application provides the vehicle body rear structure in which the frame main body preferably consists of a lower frame main body that is disposed in the lower part thereof and that has a U-shaped cross-section opened upward and an upper frame main body that is disposed in the upper part thereof and that has a U-shaped cross-section opened downward, the lower frame main body and the upper frame main body being fitted to each other in the vertical direction and in which the lower frame main body and the upper frame main body preferably have positioning portions, respectively, for defining a vertical relationship thereof.

This arrangement enables the upper and lower positioning portions to maintain the section size of the frame main body at a constant level, thereby maintaining strength and rigidity at a preferred level.

An eighth aspect of the present application provides the vehicle body rear structure in which each of the vehicle body fastening members preferably consists of a lower fastening member that is disposed in the lower part thereof and that has a U-shaped cross-section opened upward and an upper fastening member that is disposed in the upper part thereof and that has a U-shaped cross-section opened downward, the lower fastening member and the upper fastening member being fitted to each other in the vertical direction and in which the lower fastening member and the upper fastening member preferably have a flanged collar mounted therebetween.

This arrangement enables the flanged collar to maintain the section size of the vehicle body fastening member 11$b$ at a constant level, thereby maintaining the strength and rigidity at a preferred level.

A ninth aspect of the present application provides the vehicle body rear structure in which the vehicle body fastening members preferably have recesses formed therein.

With this arrangement, the joining areas as well as the recesses also function as the fragile portion, allowing the suspended frame to be easily bent and deformed.

A tenth aspect of the present application provides the vehicle body rear structure in which the recesses preferably have jig brackets with which jigs are engaged during installation to the vehicle body.

This arrangement makes it easier to use the recesses to engage the jigs with the jig brackets, thereby allowing easier installation of the battery pack to the vehicle body.

An eleventh aspect of the present application provides the vehicle body rear structure in which the load path members are preferably formed to have a U-shaped cross-section.

This arrangement makes the load path members lighter. In addition, the lighter load path members enable the transmission of an impact load from the rear suspended frame to the front suspended frame.

A twelfth aspect of the present application provides the vehicle body rear structure which, preferably, further includes a lower frame disposed below the suspended frames, the plurality of battery modules disposed between the suspended frames and the lower frame, mounting plates with which the lower frame and the battery modules are mounted to the suspended frames, and a rear cover fastened to the rear side of the rear suspended frame and the lower frame.

With this arrangement, the rear cover can receive an impact load from behind the battery modules and disperse the impact load therethrough over the rear suspended frame disposed thereabove and the lower frame.

BRIEF DESCRIPTION OF THE DRAWINGS

FIG. 8 is an end view of section taken along line VIII-VIII of FIG. 4.

FIG. 9 is an end view of section taken along line IX-IX of FIG. 4.

FIG. 12A is a plan view of a rear vehicle body structure taken before a rear-end collision. FIG. 12B is a plan view of a rear vehicle body structure in which suspended frames are deformed as a result of a rear-end collision.

DESCRIPTION OF THE PREFERRED EMBODIMENTS

Figure 1:
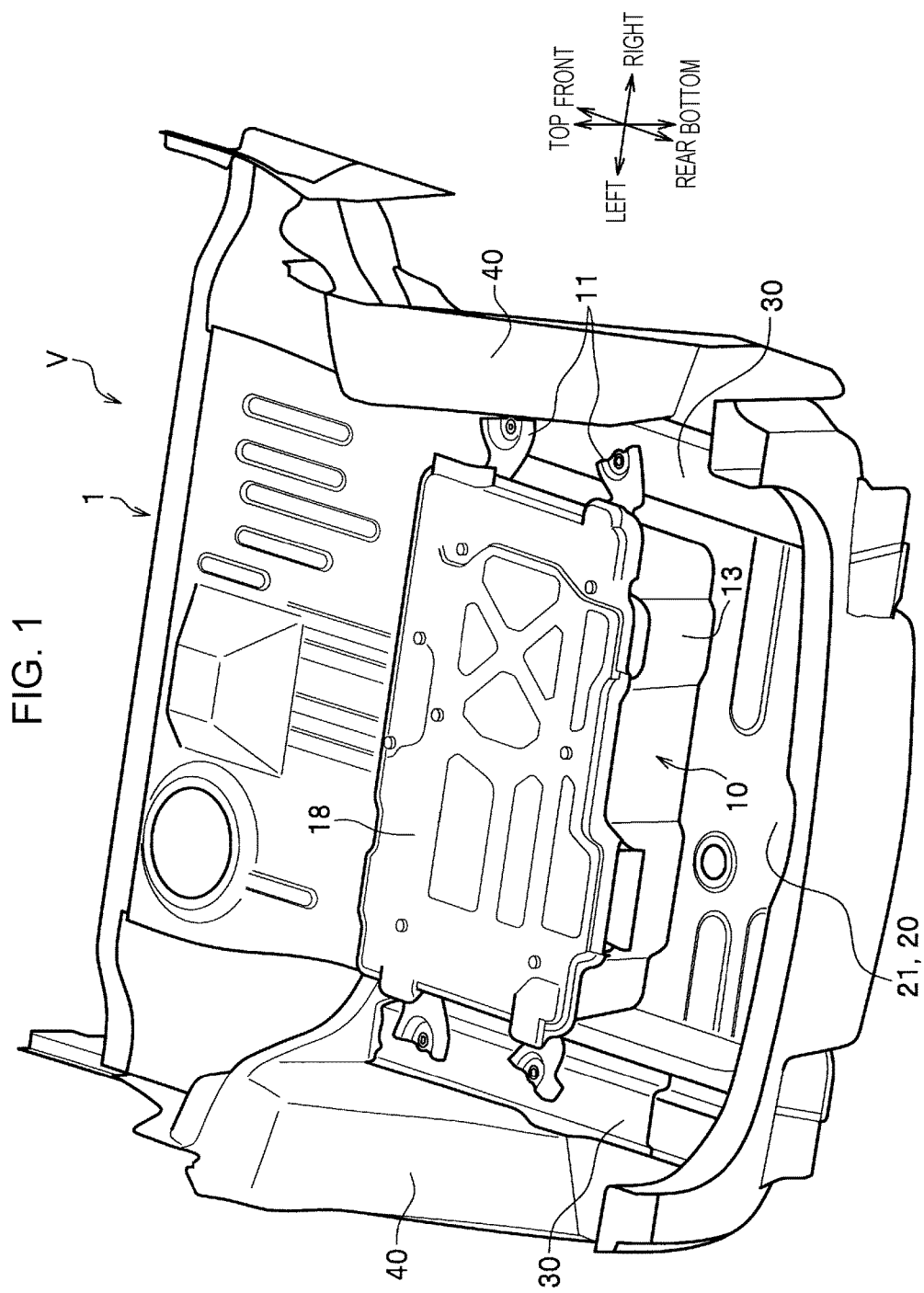
FIG. 1 is a perspective view of a motor vehicle provided with a vehicle body rear structure according to an embodiment of the present application.

An embodiment of the present application will be described below in detail with reference to the attached drawings. In the following descriptions, the same reference numerals and symbols refer to the same components, and repeated descriptions of the same components are omitted. In the attached drawings, references to "front", "rear", "right", "left", "top" and "bottom" of the vehicle are relative to the position of the driver in the driver's seat. "Vehicle-width direction" is synonymous with "right-to-left/left-to-right direction" or "lateral direction".

As shown in FIG. 1, a vehicle V having a vehicle body rear structure 1 according to the embodiment mainly includes a rear floor panel 20, a pair of right and left rear frames 30, 30, and a battery pack 10. In addition, rear wheel houses 40 are disposed on the outboard sides of the rear frames 30, respectively. The vehicle V according to the embodiment includes a hybrid vehicle and an electric vehicle that are powered by a drive motor (not illustrated) as a drive source.

The rear floor panel 20 is a metallic member that forms a floor surface of the rear section of the vehicle. The rear floor panel 20 has a floor recess 21 depressed downward therefrom.

The pair of rear frames 30, 30 are metallic members that are disposed on the right and left sides of the floor recess 21, respectively. The rear frames 30 extend in the longitudinal direction of the vehicle. The rear frames 30 will be described in detail later in this description.

Figure 2:
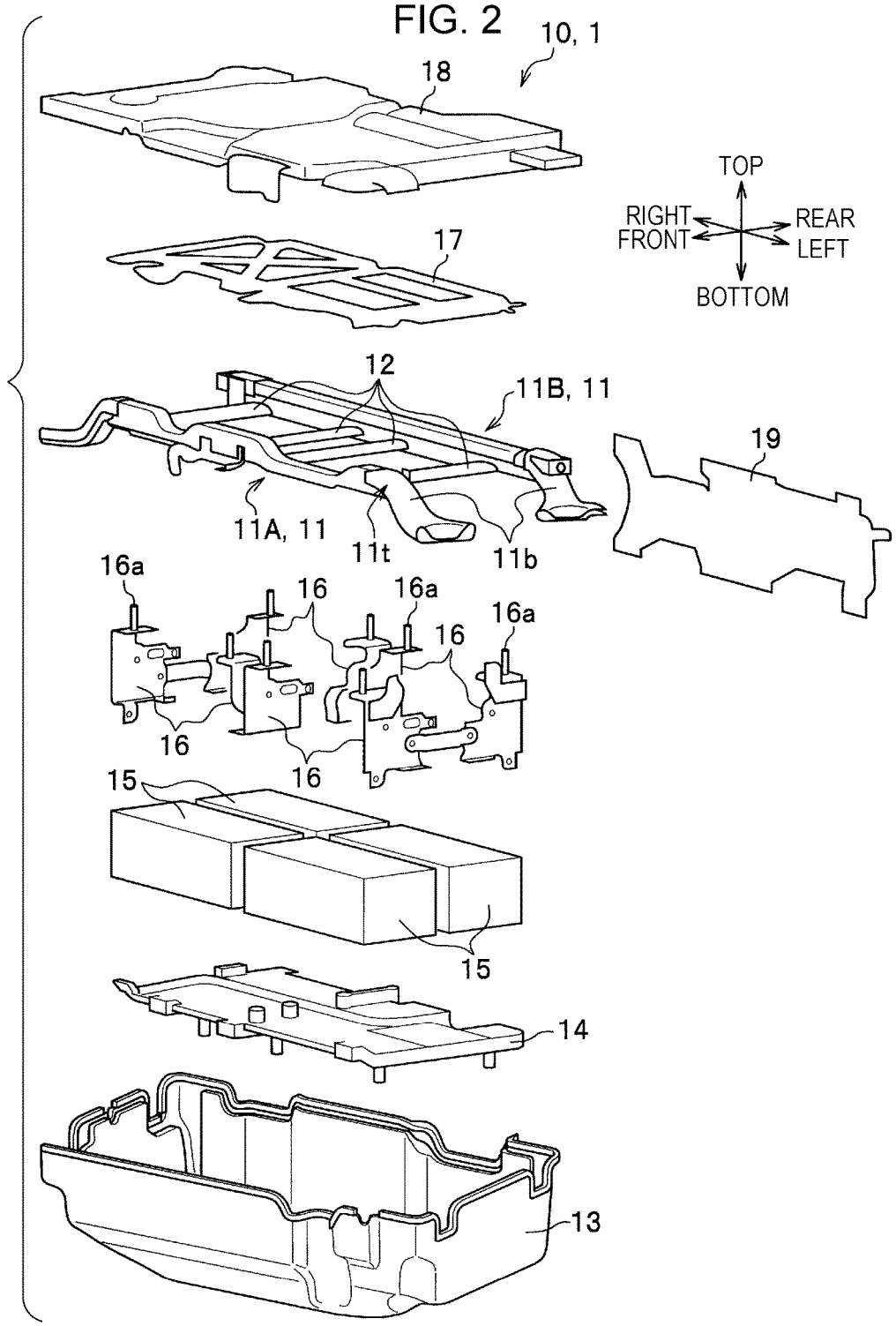
FIG. 2 is an exploded perspective view of a battery pack.

The battery pack 10 is disposed inside of the floor recess 21. As shown in FIG. 2, the battery pack 10 includes a casing 13, a lower frame 14, a plurality of battery modules 15, 15, a plurality of mounting plates 16, 16, a pair of front and rear suspended frames 11, 11, a plurality of load path members 12, 12, an upper plate 17, a top cover 18, and a rear cover 19.

The casing 13 is a box-shaped component made of resin that is opened upward. The casing 13 has the above-mentioned components other than the top cover 18 housed thereinside.

The lower frame 14 is a plate-like rectangular die-cast aluminum member. The lower frame 14 is disposed below the battery modules 15 and the suspended frames 11.

The battery modules 15 supply electric power to the drive source (not illustrated). Each of the battery modules 15 includes a plurality of battery cells stacked in the vehicle-width direction and a pair of right and left end plates whose illustrations are omitted. The overall shape of the battery modules 15 is that of a rectangular box having longer sides thereof extending in the vehicle-width direction. The battery modules 15 are disposed between the pair of suspended frames 11 and the lower frame 14. Although there are no limitations on the number of the battery modules 15, the total of the four battery modules 15 are provided in this embodiment so as to form two rows of the battery modules 15 extending from front to back and from side to side. A high-voltage inverter and a power control unit (PCU) (not illustrated) are disposed around the battery modules 15 so as to be located between the pair of suspended frames 11 and the lower frame 14.

The mounting plates 16 are metallic members with which the lower frame 14 and the battery modules 15 are mounted to the suspended frames 11. The mounting plates 16 are formed in a predetermined, complicated shape through the process of giving bends and cutouts to steel plates. The mounting plates 16 are provided at right and left ends of the battery modules 15, respectively. Eight of the mounting plates are provided in this embodiment. The mounting plates 16 have bolts 16a projecting upward at upper ends thereof. The bolts 16a are threaded into nuts (not illustrated) provided on the suspended frames 11. Flanges formed at lower ends of the mounting plates 16 are bolted to the lower frame 14.

The pair of front and rear suspended frames 11, 11 are metallic members that hold the battery modules 15 at the front and rear ends in such a manner that the battery modules 15 are suspended from the vehicle body. The pair of suspended frames 11, 11 extend in the vehicle-width direction so as to be spaced apart from each other in the longitudinal direction of the vehicle. In the following description, the suspended frame located closer to the vehicle front is referred to as "front suspended frame 11A", while the suspended frame located closer to the vehicle rear is referred to as "rear suspended frame 11B". The suspended frames 11 will be described in detail later in this description.

The plurality of load path members 12, 12 are metallic members that couple the pair of suspended frames 11 to each other. The load path members 12 extend in the longitudinal direction of the vehicle. The load path members 12 will be described in detail later in this description.

The upper plate 17 is a plate-like rectangular metallic member having a plurality of through-holes. The upper plate 17 is provided between the suspended frames 11, 11 and the top cover 18.

The top cover 18 is a metallic member that closes an upper-end opening of the casing 13 from above. The top cover 18 is formed in the shape of a dish that is opened downward.

The rear cover 19 is a metallic member that covers the rear suspended frame 11B, the battery modules 15, and the lower frame 14 from the rear. The rear cover 19 is formed in a plate-like rectangular shape. The rear cover 19 is bolted to the rear side of the rear suspended frame 11B and the lower frame 14. The rear cover 19 has a function to receive an impact load coming from behind the battery modules 15 in the event of a rear-end collision of the vehicle. In addition, the rear cover 19 has a function to disperse an impact load over the rear suspended frame 11B and the lower frame 14.

Next, with reference to FIGS. 3 through 10, the rear frames 30, the suspended frames 11, and the load path members 12 will be described below in detail. Since the pair of suspended frames 11, 11 are substantially symmetrical in the longitudinal direction, the description that follows focuses on the rear suspended frame 11B.

Figure 4:
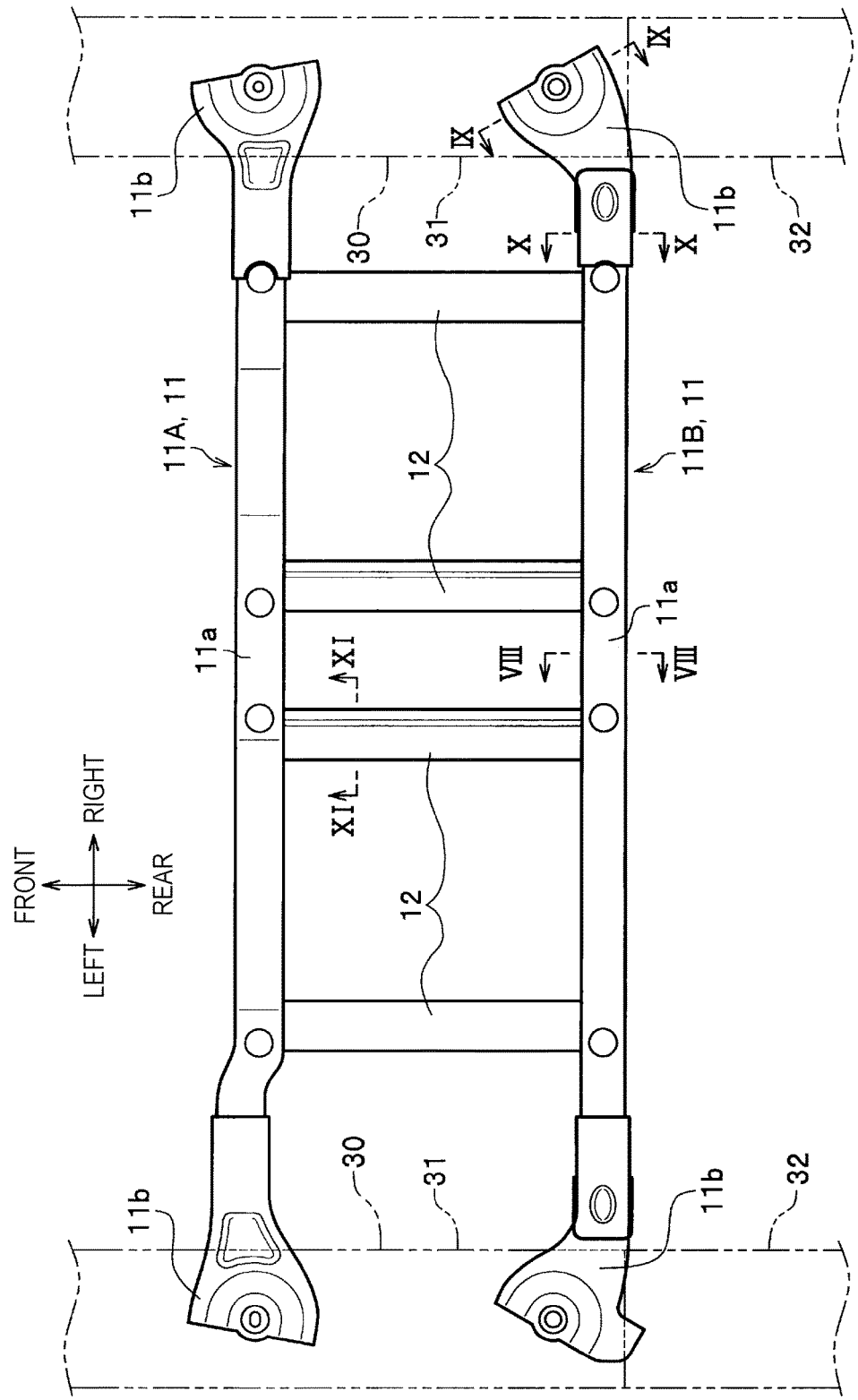
FIG. 4 is a plan view of a suspended frame and a load path member.

As shown in FIG. 4, each of the rear frames 30 consists of a higher-strength section 31 located closer to the vehicle front and a lower-strength section 32 located closer to the vehicle rear at the rear of the higher-strength section 31. The lower-strength section 32 is configured to have lower compressive strength against an impact load coming from the vehicle rear than the higher-strength section 31. The difference in compressive strength between the higher-strength section 31 and the lower-strength section 32 is provided by, for example, reinforcing members, ribs, additional through-holes, increased or reduced plate thickness, higher- or lower-strength materials, or the like.

Figure 3:
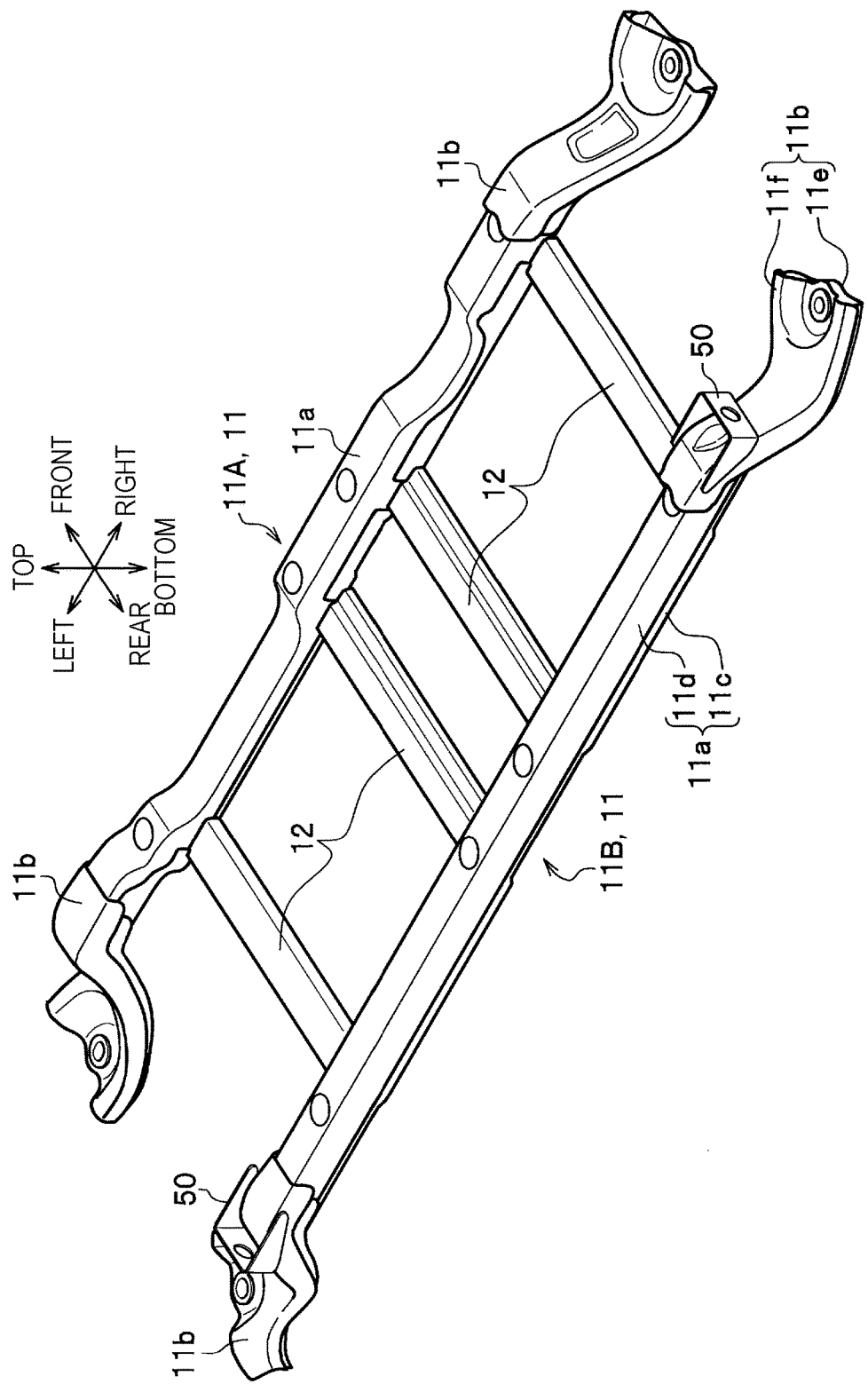
FIG. 3 is a perspective view of a suspended frame and a load path member.

As shown in FIGS. 3 and 4, each of the suspended frames 11 has a frame main body 11a extending in the vehicle-width direction and a pair of vehicle body fastening members 11b secured, respectively, to both ends in the vehicle-width direction of the frame main body 11a.

Figure 6:
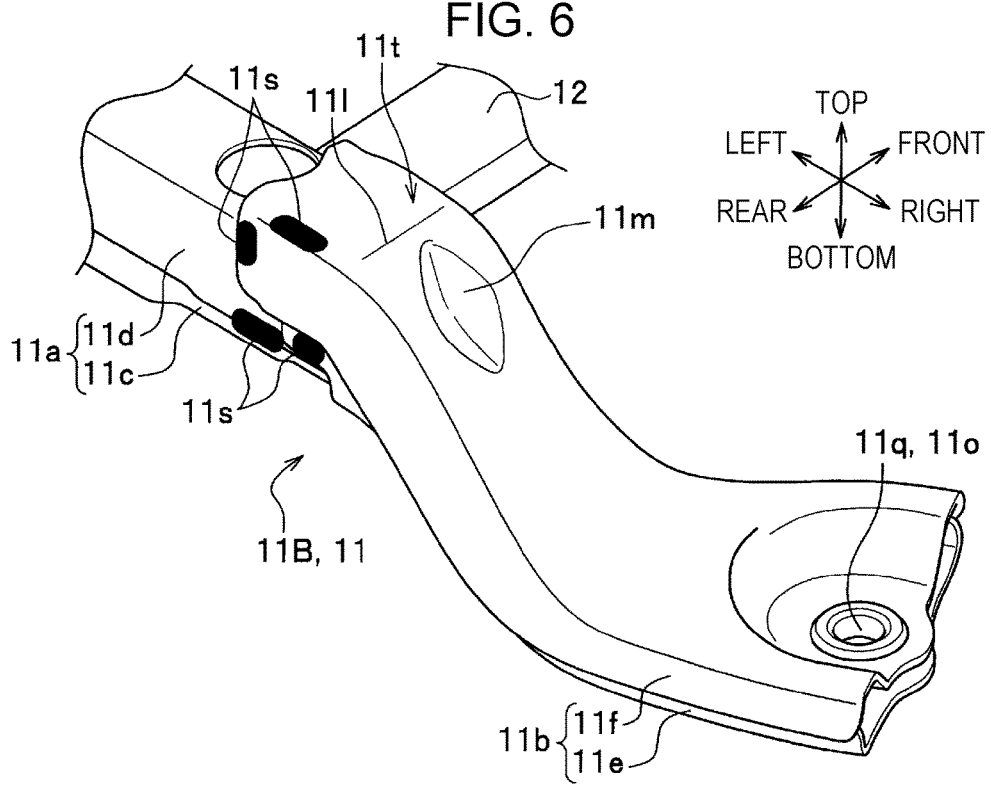
FIG. 6 is an enlarged perspective view of part of a suspended frame of FIG. 5 from which a jig bracket is removed.
Figure 7:
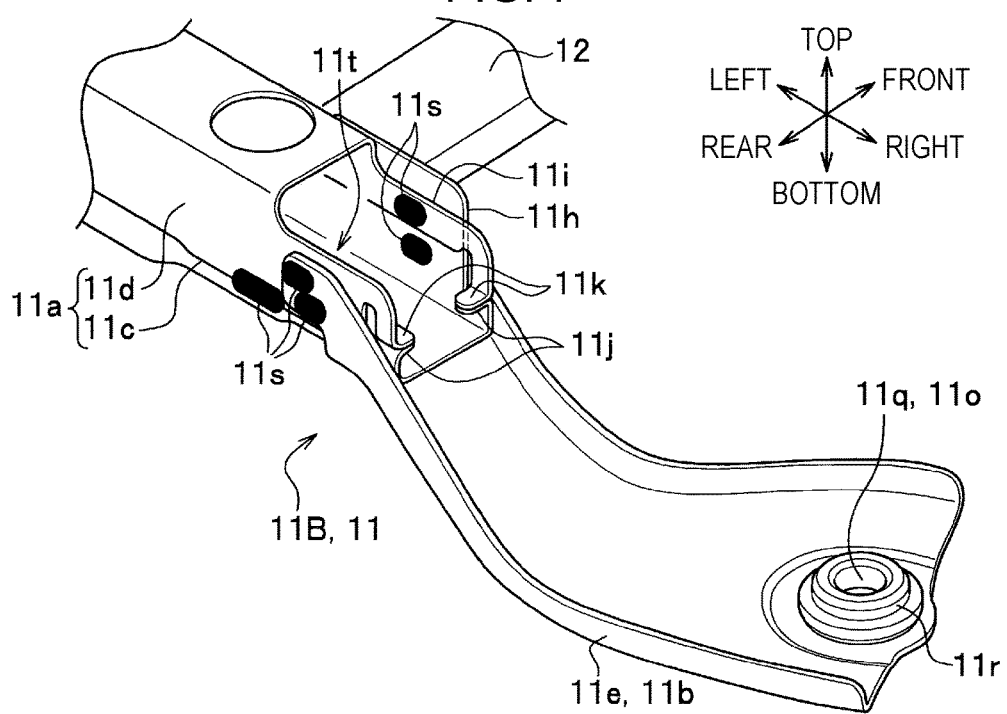
FIG. 7 is an enlarged perspective view of part of a suspended frame of FIG. 6 from which an upper fastening member is removed.

As shown in FIGS. 6 and 7, the frame main body 11a consists of a lower frame main body 11c located in the lower part thereof and an upper frame main body 11d located in the upper part thereof. The lower frame main body 11c has a pair of lower cutouts 11h provided at ends in the vehicle-width direction thereof (only one cutout illustrated in FIG. 7). In addition, the upper frame main body 11d has an upper cutout 11i provided at an end in the vehicle-width direction thereof, the upper cutout 11i being formed by cutting front and rear side walls and an upper wall.

The lower frame main body 11c and the upper frame main body 11d have lower positioning portions 11j and upper positioning portions 11k, respectively, to define a vertical relationship thereof. The lower positioning portions 11j are formed by bending the upper ends of the cut-out side walls inward. Two of the lower positioning portions 11j are provided in pairs in the longitudinal direction. The upper positioning portions 11k are formed by bending the upper ends of the cut-out side walls inward so as to project downward toward the lower positioning portions 11j. Two of the upper positioning portions 11j are provided in pairs in the longitudinal direction.

In cross-sectional view shown in FIG. 8 as seen in the vehicle-width direction, the lower frame main body 11c has a U-shaped cross-section (shaped in the form of a recessed groove) that is opened upward, while the upper frame main body 11d has a U-shaped cross-section (shaped in the form of a recessed groove) that is opened downward. The frame main body 11a consists of the lower frame main body 11c and the upper frame main body 11d that are fitted into each other in the vertical direction and has a first closed section 11g. The lower frame main body 11c and the upper frame main body 11d are joined to each other by means of MIG welding that is performed on an overlapped area thereof.

As shown in FIG. 4, the vehicle body fastening members 11b are bolted to the rear frames 30 that are part of the vehicle body. Borders between the higher-strength sections 31 and the lower-strength sections 32 shown in FIG. 4 are disposed so as to coincide with the rear end of the frame main body 11a of the rear suspended frame 11B in the longitudinal direction of the vehicle. Outboard portions of the vehicle body fastening members 11b of the front suspended frame 11A are bolted to the higher-strength sections 31. Outboard portions of the vehicle body fastening members 11b of the rear suspended frame 11B are bent toward the vehicle front so as to be disposed in front of the borders between the higher-strength sections 31 and the lower-strength sections 32 and are bolted to the higher-strength sections 31.

Figure 5:
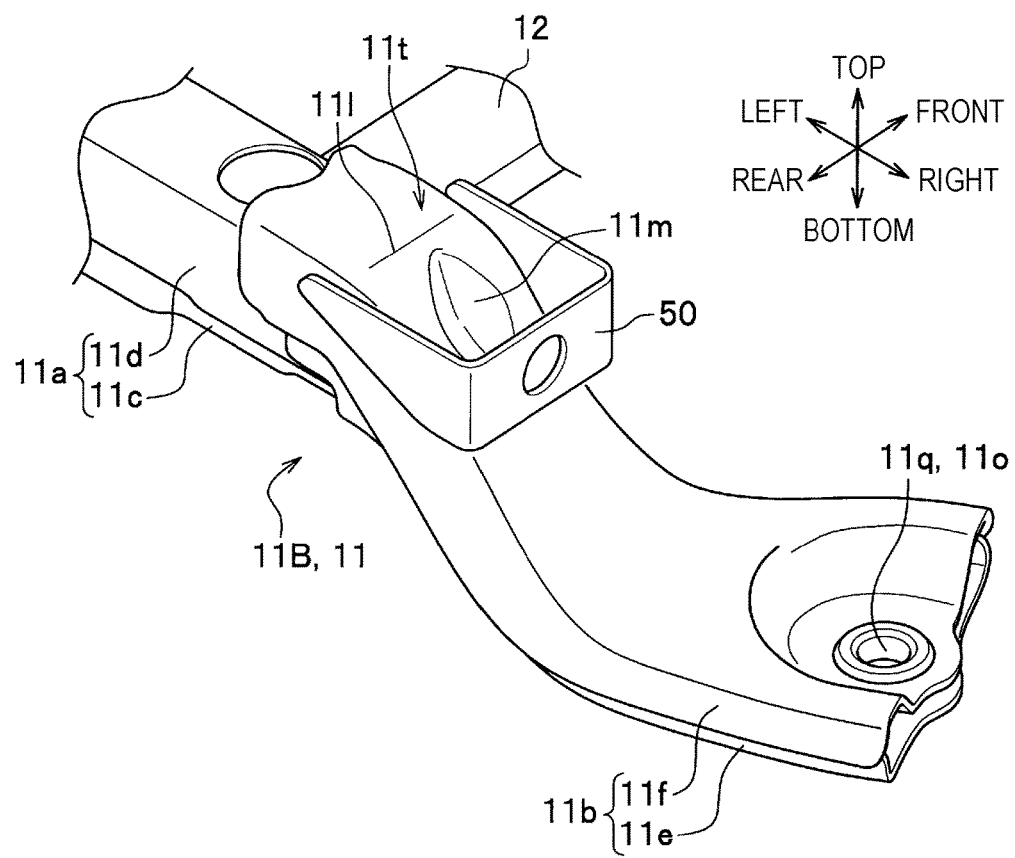
FIG. 5 is an enlarged perspective view of part of a suspended frame.

Inboard portions of the vehicle body fastening members 11b shown in FIG. 5 extend obliquely upward from the rear frames 30 to ends of the frame main body 11a and are bent toward the inboard sides in the vehicle-width direction. In other words, the vehicle body fastening members 11b have bent portions 11l at inboard ends thereof.

Each of the vehicle body fastening members 11b has a lower fastening member 11e disposed in the lower part thereof and an upper fastening member 11f disposed in the upper part thereof. The lower fastening member 11e and the upper fastening member 11f are joined to each other by means of MIG welding that is performed on an overlapped area thereof. The upper fastening member 11f has a substantially elliptically shaped recess him depressed downward therefrom in the vicinity of the bent portion 11l thereof.

The vehicle body fastening member 11b is provided with a jig bracket 50 that is engaged with a jig when the battery pack is mounted to the vehicle body. The jig bracket 50 has a U-shaped cross-section opened to the inboard side of the vehicle and is disposed so as to cover the recess 11m from both of the front and rear sides and the outboard side. Front and rear side walls of the jig bracket 50 are welded to front and rear walls of the vehicle body fastening member 11b, respectively. The outboard side wall of the jig bracket 50 is disposed away to the outboard side from the recess 11m in the vehicle-width direction so as to oppose the recess 11m.

In a cross-sectional view shown in FIG. 9 as seen in the vehicle-width direction, the lower fastening member 11e has a U-shaped cross-section (shaped in the form of a recessed groove) that is opened upward, while the upper fastening member 11f has a U-shaped cross-section (shaped in the form of a recessed groove) that is opened downward. The vehicle body fastening member 11b consists of the lower fastening member 11e and the upper fastening member 11f that are fitted into each other in the vertical direction and has a second closed section 11n.

The lower fastening member 11e has a circular through-hole 11o vertically passing therethrough. The upper fastening member 11f has a circular through-hole 11p passing therethrough. A vertically extending cylindrical flanged collar 11q is provided inside the second closed section 11n so as to be disposed closer to the outboard side of the vehicle body. The flanged collar 11q has its inner circumferential portion corresponding to the through-hole 11o and the through-hole 11p in the vertical direction. A reduced-diameter portion 11r whose diameter is reduced by a predetermined size is formed on the upper-end outer circumferential portion of the flanged collar 11q. The upper end of the reduced-diameter portion 11r is fitted into the through-hole 11p so as to slightly project outward through the through-hole 11p.

The bottom surface of the flanged collar 11q comes into contact with an opening edge of the lower fastening member 11e from above, while the stepped surface of the flanged collar 11q comes into contact with an opening edge of the upper fastening member 11f from below. In other words, the flanged collar 11q holds a vertical clearance between the lower fastening member 11e and the upper fastening member 11f, performing the function of maintaining the section size of the vehicle body fastening member 11b at a constant level. A bolt (not illustrated) for fastening the vehicle body fastening member 11b to the rear frame 30 is inserted through the flanged collar 11q, the through-hole 11o, and a through-hole (not illustrated) of the rear frame 30. The flanged collar 11q and the through-hole 11o constitute "vehicle body fastening points" of the claims.

Figure 10:
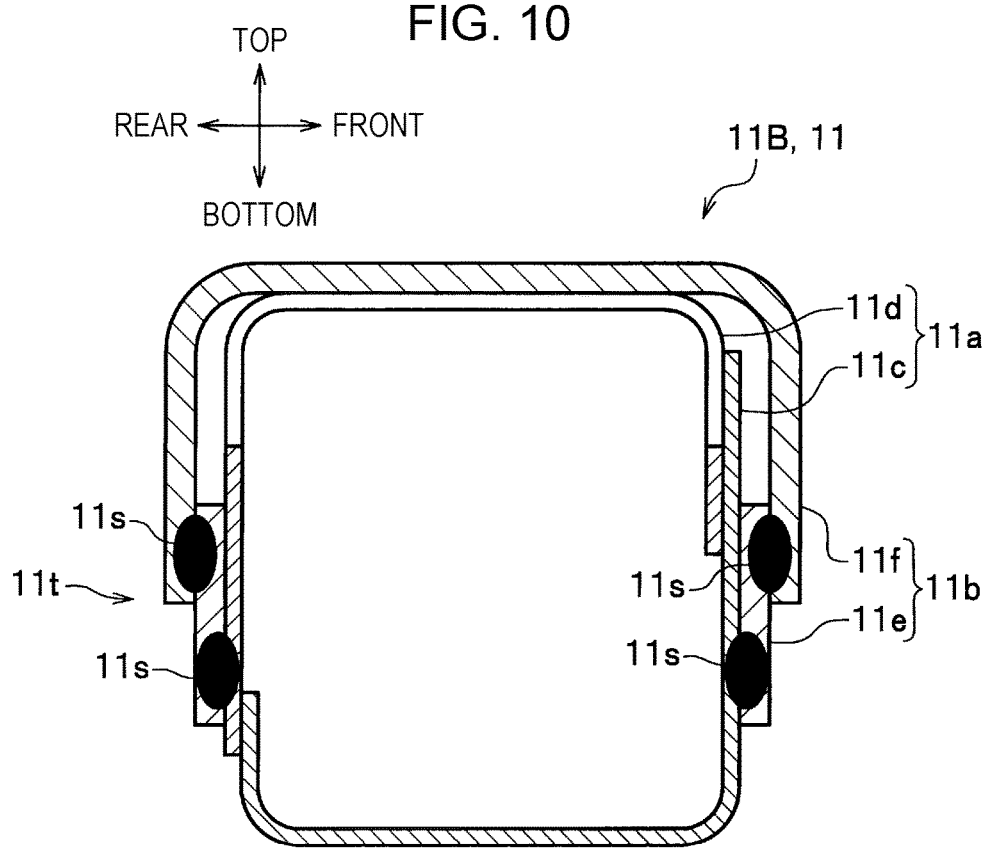
FIG. 10 is an end view of section taken along line X-X of FIG. 4.

As shown in FIGS. 6, 7, and 10, the inboard end of the vehicle body fastening member 11b is externally fitted to the outboard end of the frame main body 11a. The vehicle body fastening member 11b and the frame main body 11a are joined to each by means of MIG welding that is performed on the overlapped areas thereof (the welded areas are indicated by blackened areas marked with 11s in FIGS. 6, 7, and 10). Such overlapped or joining areas 11s consist of one-side welding where overlapped areas between the frame main body 11a and the vehicle body fastening member 11b are partially joined to each other.

The joining areas 11s are located adjacent to or close to the lower cutout 11h and the upper cutout 11i. In addition, the joining areas 11s are located close to the recess 11m. In other words, a predetermined area of the suspended frame 11 including the joining areas 11s, the lower cutout 11h, the upper cutout 11i, and the recess 11m constitutes a fragile portion 11t at which, when being subjected to an impact load in the event of a rear-end collision, is bent forward. The fragile portion 11t is located close to the flanged collar 11q and the through-hole 11o both of which constitute a vehicle body fastening point. The bent portion 11l is disposed within a region of the fragile portion 11t.

Figure 11:
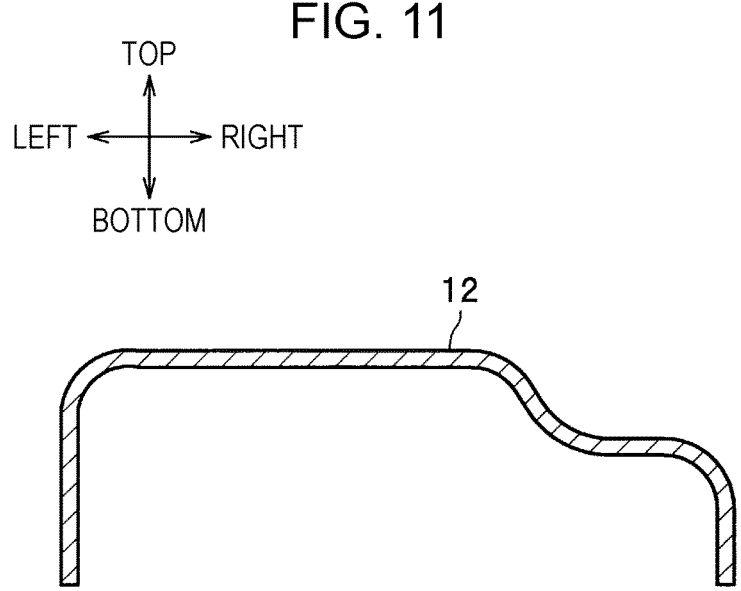
FIG. 11 is an end view of section taken along line XI-XI of FIG. 4.

As shown in FIGS. 3 and 4, the load path members 12 have the function of transmitting to the front suspended frame 11A an impact load applied to the rear suspended frame 11B in the event of a rear-end collision. Front ends of the load path members 12 are welded to rear side walls of the front suspended frame 11A, while rear ends of the load path members 12 are welded to front side walls of the rear suspended frame 11B. Although there are no limitations on the number of the load path members 12, four of the load path members 12 are spaced apart from one another in the vehicle-width direction in this embodiment. The suspended frames 11, 11 and the load path members 12, 12 are constructed in the form of a ladder. Although there are no limitations on the shape of the load path members 12, the load path members 12 according to this embodiment have U-shaped cross-sections that are opened downward as shown in FIG. 11.

Next, with reference to FIGS. 12A and 12B, the vehicle body rear structure 1 according to this embodiment will be described in terms of behavior associated with a rear-end collision. For the sake of convenience, the battery pack 10 and the battery modules 15 are schematically illustrated by two-dot chain lines in FIGS. 11A and 11B.

As shown in FIG. 12A, before a rear-end collision, the pair of the suspended frames 11 are substantially linear in the vehicle-width direction and are disposed with a predetermined clearance G therebetween extending in the longitudinal direction.

When the vehicle V is rear-ended, an impact load is applied to the rear suspended frame 11B disposed at the upper part of the battery pack 10 and the lower frame 14 disposed at the lower part of the battery pack 10 through the rear cover 19 (see FIG. 2).

The impact load applied to the rear suspended frame 11B is transmitted to the front suspended frame 11A through the load path members 12. The impact load applied to the lower frame 14 is transmitted to walls that define the floor recess 21. In other words, the rear suspended frame 11B, the load path members 12, and the lower frame 14 perform a function as a load transmitting member that transmits the impact load from rear to front, thereby preventing or reducing the application of the impact load to the battery modules 15 and the high-voltage components disposed between the suspended frames 11, 11 and the lower frame 14.

As shown in FIG. 12B, when subjected to the impact load, the front suspended frame 11A and the rear suspended frame 11B are bent forward at the fragile portions 11t formed at both ends in the vehicle-width direction thereof. More specifically, sections between both the fragile portions 11t of the front suspended frame 11A and the rear suspended frame 11B are displaced forward. At this time, the front suspended frame 11A and the rear suspended frame 11B are equal or substantially equal in displacement amount, resulting in the clearance G remaining unchanged before and after the application of the impact load.

When the front suspended frame 11A and the rear suspended frame 11B are displaced, the battery pack 10 including the battery modules 15 is moved forward relative to the vehicle body.

Next, the vehicle body rear structure 1 according to this embodiment will be described in terms of effects.

In the vehicle body rear structure 1 according to this embodiment, the suspended frames 11, 11 are bent forward at the fragile portions 11t in the event of a rear-end collision. In conjunction with this, the battery pack 10 is moved forward relative to the vehicle body, thereby reducing an impact to the battery pack 10. In addition, the forward movement of the battery pack 10 for reducing the impact eliminates the need for reinforcing the battery pack 10 itself, contributing to weight reduction and cost saving.

In this embodiment, due to the fragile portion 11t being formed in a predetermined area including the joining areas 11s between the frame main body 11a and the vehicle body fastening member 11b, the strength of the fragile portion 11t can be adjusted simply by adjusting the joint strength of the joining areas 11s, making it easier to design the fragile portion 11t.

In this embodiment, due to the joining areas 11s being located adjacent to or close to the lower cutout 11h and the upper cutout 11i, the strength of the fragile portion 11t can be adjusted simply by increasing or reducing the amount of cutout, making it easier to design the fragile portion 11t.

In this embodiment, due to the joining areas 11s consisting of one-side welding where overlapped areas between the frame main body 11a and the vehicle body fastening member 11b are partially joined to each other, the strength of the joining areas 11s can be adjusted simply by adjusting welding strength, making it easier to configure the strength of the joining areas 11s.

In this embodiment, the inboard portion of the vehicle body fastening member 11b extends obliquely upward from the rear frame 30 to the end of the frame main body 11a and is bent toward the inboard side in the vehicle-width direction, thereby enabling the battery pack 10 to be vertically sized up. In addition, the bent portion 11l of the vehicle body fastening member 11b is disposed within a region of the fragile portion 11t, thereby enabling the forward movement of the battery pack 10 to be increased through the use of an upper space as well.

In this embodiment, due to each of the vehicle body fastening members 11b of the front suspended frame 11A and the rear suspended frame 11B being bolted to the higher-strength section 31, the clearance between the front and rear vehicle body fastening members 11b, 11b bolted to the higher-strength section 31 can be maintained at a constant level in the longitudinal direction even if the lower-strength section 31 of the rear frame 30 collapses, thereby reducing an impact to the battery pack 10.

In this embodiment, the lower positioning portion 11j and the upper positioning portion 11k for defining the vertical relationship between the lower frame main body 11c and the upper frame main body 11d can maintain the section size of the frame main body 11a at a constant level, thereby maintaining strength and rigidity at a preferred level.

In this embodiment, the flanged collar 11q holding a vertical clearance between the lower fastening member 11e and the upper fastening member 11f can maintain the section size of the vehicle body fastening member 11b at a constant level, thereby maintaining the strength and rigidity at a preferred level.

In this embodiment, the recess 11m formed in the upper fastening member 11f also functions as the fragile portion 11t, allowing the suspended frame 11 to be easily bent and deformed.

In this embodiment, the jig bracket 50 being disposed so as to cover the recess 11m from both of the front and rear sides and the outboard side makes it easier to use the recess 11m to engage the jig with the jig bracket 50, thereby allowing easier installation of the battery pack 10 to the vehicle body.

In this embodiment, the load path member 12 has a U-shaped cross-section, which makes the load path member 12 lighter. In addition, the lighter load path member 12 enables the transmission of an impact load from the rear suspended frame 11B to the front suspended frame 11A.

In this embodiment, due to being bolted to the rear side of the rear suspended frame 11B and the lower frame 14, the rear cover 19 can receive an impact load from behind the battery modules 15 and disperse the impact load therethrough over the rear suspended frame 11B disposed thereabove and the lower frame 14 disposed therebelow.

Although the vehicle body rear structure 1 according to the present application is typically described with reference to, but not limited to, the foregoing embodiment. Various modifications are conceivable within the scope of the present application.

For example, the shapes of the suspended frame 11 and the load path member 12 are not limited to those described in the embodiment and may be changed when appropriate. In addition, the load path member 12 is disposed so as to be linear in the longitudinal direction in the embodiment, but may be disposed diagonally rightward or leftward relative to the longitudinal direction.

The lower cutout 11h, the upper cutout 11i, and the recess 11m are provided in the embodiment, but may be omitted.

In addition, the flanged collar 11q is provided in the embodiment, but may be omitted. The flanged collar 11q and the through-hole 11o constitute "vehicle body fastening points" of the claims, through which a bolt for fastening the vehicle body fastening member 11b to the rear frame 30 is inserted.

What is claimed is:

1. A vehicle body rear structure comprising:
a floor recess depressed downward from a rear floor of a vehicle body; and
a battery pack disposed in the floor recess and comprising, battery modules,
a pair of front and rear suspended frames that hold the battery modules at front and rear sides thereof in a manner that suspends the battery modules from the vehicle body, and
load path members through which the pair of suspended frames are connected to each other, and
wherein each of the front and rear suspended frames comprises, vehicle body fastening points that are fastened to the vehicle body, and fragile portions that are provided in a vicinity of the respective vehicle body fastening points and configured to allow each suspended frame to bend forward when the vehicle body is subjected to an impact load in an event of a rear-end collision, wherein each of the pair of suspended frames has, a frame main body having a closed cross-section and extending in a vehicle-width direction, and vehicle body fastening members that are secured to respective ends of the frame main body in the vehicle-width direction via joining area formed between the frame main body and each of the vehicle body fastening members, the vehicle body fastening members including the respective vehicle body fastening points, and wherein the fragile portions are formed in predetermined areas including the joining areas between the frame main body and each of the vehicle body fastening members.

2. The vehicle body rear structure according to claim 1, wherein the fragile portions have cutouts formed by cutting part of ends of the frame main body in the vehicle-width direction in regions adjacent to or close to the joining areas.

3. The vehicle body rear structure according to claim 1, wherein the joining areas have one-side welded portions such that the frame main body and the vehicle body fastening members are partially joined to each other.

4. The vehicle body rear structure according to claim 1, wherein the vehicle body fastening members extend upward toward the frame main body from the vehicle body and are bent toward the inboard side in the vehicle-width direction of the vehicle body, and wherein the bent portions are disposed within regions of the fragile portions.

5. The vehicle body rear structure according to claim 1, further comprising:

a pair of right and left rear frames that are disposed on right and left sides of the floor recess in the vehicle-width direction, respectively, and that extend in a vehicle rear-front direction, wherein each of the rear frames has a higher-strength section located on a vehicle front side thereof and a lower-strength section located on a vehicle rear side of the higher-strength section and that has lower compressive strength against an impact load from the vehicle rear side than the higher-strength section;

wherein the vehicle body fastening members of the front suspended frame are fastened to the respective higher-strength sections; and wherein the vehicle body fastening members of the rear suspended frame are bent toward the vehicle front and are fastened to the respective higher-strength sections.

6. The vehicle body rear structure according to claim 1, wherein each frame main body of the suspended frames is formed of a lower frame main body that is disposed in a lower part thereof and that has a U-shaped cross-section opened upward and an upper frame main body that is disposed in an upper part thereof and that has a U-shaped cross-section opened downward, the lower frame main body and the upper frame main body being fitted to each other in a vertical direction; and wherein the lower frame main body and the upper frame main body have positioning portions, respectively, that define a vertical relationship thereof.

7. The vehicle body rear structure according to claim 1, wherein each of the vehicle body fastening members is formed of a lower fastening member that is disposed in a lower part thereof and that has a U-shaped cross-section opened upward and an upper fastening member that is disposed in an upper part thereof and that has a U-shaped cross-section opened downward, the lower fastening member and the upper fastening member being fitted to each other in a vertical direction; and wherein each of the vehicle body fastening members has a flanged collar mounted between the lower fastening member and the upper fastening member.

8. The vehicle body rear structure according to claim 1, wherein each of the vehicle body fastening members has a recessed portion formed therein.

9. The vehicle body rear structure according to claim 8, wherein the recessed portions have jig brackets configured to hold jigs when the jigs are installed to the vehicle body.

10. The vehicle body rear structure according to claim 1, wherein each of the load path members has a U-shaped cross-section.

11. The vehicle body rear structure according to claim 1, further comprising:

a lower frame disposed below the suspended frames, the plurality of battery modules being disposed between the suspended frames and the lower frame;

mounting plates with which the lower frame and the battery modules are mounted to the suspended frames; and a rear cover fastened to a rear side of the rear suspended frame and the lower frame.

* * * * *